US007166237B2

(12) United States Patent  
Klett et al.

(10) Patent No.: US 7,166,237 B2
(45) Date of Patent: *Jan. 23, 2007

(54) PITCH-BASED CARBON FOAM HEAT SINK WITH PHASE CHANGE MATERIAL

(75) Inventors: James W. Klett, Knoxville, TN (US); Timothy D. Burchell, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 772 days.

This patent is subject to a terminal disclaimer.

(21) Appl. No.: 10/246,597

(22) Filed: Sep. 17, 2002

(65) Prior Publication Data

US 2003/0015811 A1 Jan. 23, 2003

Related U.S. Application Data

(60) Division of application No. 09/489,640, filed on Jan. 24, 2000, now Pat. No. 6,780,505, which is a continuation-in-part of application No. 09/337,027, filed on Jun. 25, 1999, now Pat. No. 6,261,485, which is a continuation-in-part of application No. 09/136,596, filed on Aug. 19, 1998, now Pat. No. 6,387,343, which is a continuation of application No. 09/093,406, filed on Jun. 8, 1998, now Pat. No. 6,037,032, which is a continuation-in-part of application No. 08/921,875, filed on Sep. 2, 1997, now Pat. No. 6,033,506, and a continuation-in-part of application No. 08/923,877, filed on Sep. 2, 1997, now abandoned, which is a continuation of application No. 08/921,875, filed on Sep. 2, 1997, now Pat. No. 6,033,506, which is a division of application No. 08/921,875, filed on Sep. 2, 1997, now Pat. No. 6,033,506.

(51) Int. Cl.
C09K 5/00 (2006.01)

(52) U.S. Cl. .................... 252/67; 165/104.19; 423/448

(58) Field of Classification Search ................ 423/448; 165/75, 104.19; 252/67
See application file for complete search history.

(56) References Cited

U.S. PATENT DOCUMENTS

| 2,401,797 A | 6/1946 | Rasmussen .............. 210/150.5 |
| 3,306,353 A | 2/1967 | Burne .......................... 165/164 |
| 3,453,809 A | 7/1969 | Henderson ................... 55/369 |
| 3,558,276 A | 1/1971 | Otani et al. ................ 23/209.1 |
| 3,784,487 A | 1/1974 | Franck et al. ............. 260/2.5 F |
| 3,914,392 A | 10/1975 | Klett ............................ 264/29 |
| 3,973,718 A | 8/1976 | Deschamps ................. 228/183 |
| 3,979,196 A | 9/1976 | Frank et al. .................... 65/25 |
| 4,005,183 A | 1/1977 | Singer ..................... 423/447.2 |
| 4,007,324 A | 2/1977 | Wallouch ........................ 13/18 |
| 4,025,689 A | 5/1977 | Kobayashi et al. .......... 428/402 |
| 4,057,101 A | 11/1977 | Ruka et al. |
| 4,096,097 A | 6/1978 | Yan ............................ 252/510 |
| 4,125,676 A | 11/1978 | Maricle et al. ............... 429/38 |
| 4,205,055 A | 5/1980 | Maire et al. ................ 423/445 |
| 4,225,463 A | 9/1980 | Unger et al. ................ 252/445 |
| 4,272,356 A | 6/1981 | Stiller et al. .............. 208/8 LE |
| 4,276,246 A | 6/1981 | Bonzom et al. .............. 264/53 |
| 4,303,431 A | 12/1981 | Torobin ...................... 65/21.4 |
| 4,311,682 A | 1/1982 | Miyazaki et al. ........... 426/448 |
| 4,318,824 A | 3/1982 | Turner ........................ 252/421 |
| 4,408,659 A | 10/1983 | Hermanns et al. |
| 4,439,349 A | 3/1984 | Everett et al. .............. 502/180 |
| 4,442,165 A | 4/1984 | Gebhardt et al. ........ 428/307.7 |
| 4,487,687 A | 12/1984 | Simo et al. .................. 208/56 |
| 4,512,388 A | 4/1985 | Clear et al. .................... 165/1 |
| 4,518,483 A | 5/1985 | Dickakan ..................... 208/44 |
| 4,525,492 A | 6/1985 | Rastall et al. ............... 451/181 |
| 4,550,015 A | 10/1985 | Korb et al. ................. 423/445 |
| 4,572,864 A | 2/1986 | Benson et al. ........... 428/305.5 |
| 4,605,595 A | 8/1986 | Tsang et al. ................ 428/413 |
| RE32,319 E | 12/1986 | Korb et al. ................. 423/445 |
| 4,637,906 A | 1/1987 | Fukuda et al. ............. 462/29.1 |

(Continued)

FOREIGN PATENT DOCUMENTS

FR 2411811 7/1979

(Continued)

OTHER PUBLICATIONS

Klett, J. and Edie, D., "Flexible Towpreg for the Fabrication of High Thermal Conductivity Carbon/Carbon Composites", *Carbon*, 33:10, pp. 1485-1503.

(Continued)

*Primary Examiner*—Stuart Hendrickson
(74) *Attorney, Agent, or Firm*—Akerman Senterfitt; Neil R. Jetter

(57) ABSTRACT

A process for producing a carbon foam heat sink is disclosed which obviates the need for conventional oxidative stabilization. The process employs mesophase or isotropic pitch and a simplified process using a single mold. The foam has a relatively uniform distribution of pore sizes and a highly aligned graphic structure in the struts. The foam material can be made into a composite which is useful in high temperature sandwich panels for both thermal and structural applications. The foam is encased and filled with a phase change material to provide a very efficient heat sink device.

17 Claims, 13 Drawing Sheets

U.S. PATENT DOCUMENTS

| | | | |
|---|---|---|---|
| 4,659,624 A | 4/1987 | Yeager et al. | 428/408 |
| 4,775,655 A | 10/1988 | Edwards et al. | 502/416 |
| 4,782,586 A | 11/1988 | Joo et al. | 29/623.5 |
| 4,806,290 A | 2/1989 | Hopper et al. | |
| 4,832,881 A | 5/1989 | Arnold, Jr. et al. | 264/29.7 |
| 4,873,071 A | 10/1989 | Yamada et al. | 423/448 |
| 4,873,218 A | 10/1989 | Pekela | 502/418 |
| 4,892,783 A | 1/1990 | Brazel | 428/282 |
| 4,917,835 A | 4/1990 | Lear et al. | 264/29.1 |
| 4,934,657 A | 6/1990 | Dodson | 251/214 |
| 4,978,649 A | 12/1990 | Surovikin et al. | 502/416 |
| 4,992,254 A | 2/1991 | Kong | 423/449 |
| 4,999,385 A | 3/1991 | McCullough, Jr. et al. | 521/149 |
| 5,019,164 A | 5/1991 | Tomita et al. | 106/22 |
| 5,047,225 A | 9/1991 | Kong | 423/447.2 |
| 5,053,148 A | 10/1991 | Von Bonin | 252/8.05 |
| 5,071,631 A | 12/1991 | Takabatake | 423/445 |
| 5,076,845 A | 12/1991 | Seo et al. | 106/284.4 |
| 5,114,635 A | 5/1992 | Sohda et al. | 264/29.2 |
| 5,138,832 A | 8/1992 | Pande | 60/203.1 |
| 5,217,701 A | 6/1993 | Sakata et al. | 423/447.1 |
| 5,232,772 A | 8/1993 | Kong | 428/312.2 |
| 5,248,705 A | 9/1993 | McGuigan et al. | 521/149 |
| 5,300,272 A | 4/1994 | Simandi et al. | 423/445 R |
| 5,384,193 A | 1/1995 | Suh et al. | 428/375 |
| 5,437,927 A | 8/1995 | Ross et al. | 428/367 |
| 5,451,825 A | 9/1995 | Strohm | |
| 5,481,149 A | 1/1996 | Kambe et al. | |
| 5,487,946 A | 1/1996 | McGinniss et al. | 428/413 |
| 5,530,309 A | 6/1996 | Weldon | |
| 5,540,903 A | 7/1996 | Romine | 423/445 R |
| 5,556,892 A | 9/1996 | Pekala | 521/181 |
| 5,578,255 A | 11/1996 | Okuyama et al. | 264/29.5 |
| 5,580,500 A | 12/1996 | Muramatsu et al. | 264/29.1 |
| 5,582,781 A | 12/1996 | Hayward | 264/28 |
| 5,587,618 A | 12/1996 | Hathaway | |
| 5,614,134 A | 3/1997 | Sohda et al. | 264/29.1 |
| 5,695,816 A | 12/1997 | Iwashita et al. | 427/228 |
| 5,705,106 A | 1/1998 | Kolesnikov et al. | 264/29.1 |
| 5,709,914 A | 1/1998 | Hayes | 428/35.1 |
| 5,733,484 A | 3/1998 | Uchida et al. | 264/29.1 |
| 5,770,127 A | 6/1998 | Abrams et al. | 264/29.1 |
| 5,783,879 A | 7/1998 | Furlani et al. | |
| 5,821,659 A | 10/1998 | Smith | |
| 5,822,839 A | 10/1998 | Ghosh et al. | |
| 5,868,974 A | 2/1999 | Kearns | 264/29.6 |
| 5,882,621 A | 3/1999 | Doddapaneni et al. | 423/445 |
| 5,888,430 A | 3/1999 | Wakayama et al. | 252/503 |
| 5,888,469 A | 3/1999 | Stiller et al. | 423/445 R |
| 5,902,562 A | 5/1999 | Lagasse et al. | 423/445 |
| 5,945,084 A | 8/1999 | Droege | 423/447.4 |
| 5,954,937 A | 9/1999 | Farmer | 205/687 |
| 6,013,371 A | 1/2000 | Hager et al. | 428/408 |
| 6,033,506 A | 3/2000 | Klett | 156/78 |
| 6,037,032 A | 3/2000 | Klett et al. | 428/71 |
| 6,051,905 A | 4/2000 | Clark | |
| 6,074,888 A | 6/2000 | Tran et al. | |
| 6,077,464 A | 6/2000 | Murdie et al. | 264/29.5 |
| 6,103,149 A | 8/2000 | Stankiewicz | |
| 6,126,874 A | 10/2000 | Dillon et al. | 264/29.7 |
| 6,142,222 A | 11/2000 | Kang et al. | 165/148 |
| 6,780,505 B1 * | 8/2004 | Klett et al. | 428/367 |

FOREIGN PATENT DOCUMENTS

| | | |
|---|---|---|
| JP | 408048509 A | 2/1996 |
| WO | WO 95/08210 | 3/1995 |
| WO | WO 9827023 | 6/1998 |
| WO | WO 99 64223 | 1/1999 |
| WO | WO 99 11585 | 3/1999 |
| WO | WO 99 11586 | 3/1999 |

OTHER PUBLICATIONS

Edie, D.D., "Pitch and Mesophase Fibers", pp. 1-30 (1990) (from *Carbon Fibers and Filmaments* J.L. Figueiredo, Ed., Kluwer Academic Publishers).

Klett, J., "High Thermal Conductivity Mesophase Pitch-Derived Carbon Foam," Proceedings of the 1998 43rd Int'l SAMPE Symposium and Exhibition, Part 1 of 2, Anaheim, CA, 43:1, pp. 745-755 (May 31-Jun. 4, 1998).

Anderson, H.J. Anderson, D.P., Kearns, K.M., "Microcellular Pitch-Based Carbon Foams Blown with Helium Gas," Proceedings of the 1998 43rd Int'l SAMPE Symposium and Exhibition, Part 1 of 2, Anaheim, CA, 43:1, pp. 745-755 (May 31-Jun. 4, 1998).

Klett, J.W., Burchell, T.D., "High Thermal Conductivity, Mesophase Pitch Derived Carbon Foam," *Science and Technology of Carbon*, Extended Abstracts and Programme, Eurocarbon, vol. II, Strasbourg, France (Jul. 5-9, 1998).

Klett, J.W., Watts, C., Burchell, T., "High Thermal Conductivity, Mesophase Ptich Derived Carbon Foams: Effect of Precursor on Structure and Properties," Carbon '99, 24th Biennial Conference on Carbon (Jul. 11-16, 1999).

Klett, J.W., "High Thermal Conductivity, Mesophase Pitch-Derived Graphic Foams," *J. Composites in Mfg.*, 15:4, pp. 1-7.

"Poco Graphie Foam Update 1," pages published at the website of Poco Graphite, Inc., of Decatur, Texas at >>poco.com/pocofoam/grafpod.com>>as downloaded on Jan. 21, 2000.

Hexcel Product Data Sheet (1997).

Kearns, K., Graphitic Carbon Foam Processing, 21st Annual Conference on Composites, Materials and Structures, Jan. 26-31, 1997, Cocoa Beach, FL pp. 835-847 (1997).

Lake, M.L., "Simple Process Produces High Modulus Carbon Fibers at Much Lower Cost,"*Mat. Tech.* 11(4):137-139 (1996).

Jones, S.P., Fian, C.C. and Edie, D.D., "Structural Development in Mosephase Pitch Based Carbon Fibers Produced from Naphthalene," 35(10): 1533-1543 (1997).

Amoco Product Literature (1997).

Steiner, K.V., et al., "Production and Properties of Ultra-Lightweight Aluminum Foams for Industrial Applications," Proceeding from the 4th International Conference on Composites Engineering, Edited by David Hui, pp. 943-944 (1997).

Inoue, K., "Application of Laser Flash Method to Penetrative Materials for Measurement of Thermal Diffusivity," *High Temp. Tech.* 8(1): 21-26 (1990).

Ohlorst, C.W. et al., "Thermal Conductivity Database of Various Structural Carbon—Carbon Composite Materials," NASA Technical Memorandum 4787 (Nov. 1997).

Mehta, R. et al., "Graphic Carbon Foams: Processing and Characterization," 21st Bieneial Conference on Carbon, Conf. Proceedings, American Carbon Society, Buffalo, NY, pp. 104-105 (1993).

Cowan, R.D., "Pulse Method of Measuring Thermal Diffusivity at High Temperatures," J. of App. Phys., 34(4), pp. 926-927 (1962).

*Introduction to Carbon Science*, ed. Harry Marsh, Butterworths and Co., Ltd., London, pp. 6-16, 39-44, 47-49, 51-52, 55-58, 61 and 109 (1989).

Brooks and Taylor, "The Formation of Graphitizing Carbons from the Liquid Phase," *Carbon*, 3(2), pp. 185-193 (1965).

Rouzaud, J.N. and Oberlin, A., "Structure, Microtexture and Optical Properties of Anthracene and Saccharose-Based Carbons," *Carbon*, 27(4), pp. 517-519 (1989).

Rand, B., "Matrix Precursors for Carbon—Carbon Composites," in *Essentials in Carbon—Carbon Composites*, edited by C.R. Thomas, Royal Society of Chemistry, London pp. 67-102 (1993).

Kelly, B.T., "The Thermal Conducitivity of Graphite," *Physics and Chemistry of Carbon*, 5, pp. 119-215 (1969).

Adams, P.M., Katzman, H.A. and Rellick, G.S., "Microstructural and X-Ray Diffraction Studies of Carbon/Carbon Composites for Thermal Management Applications," Aerospace Report No. ATR-98-(8565)-1, Naval Surface Warfare Center Carderock Division, Contract No. F04701-93-C-0094, Mar. 1, 1998.

Ultramet Product Literature, 1998 (for Ultrafoam$_c$).

Japan Patent Publication No. 04163319, Published Jun. 8, 1992 (one page English abstract from European Patent Office).

Klett, J. and Edie, D., "Flexible Towpreg for the Fabrication of High Therman Conductivity Carbon/Carbon Composites," URL:http://ww.ms.ornl.gov.cimtech/cfcms/towpreg.html. Last updated Apr. 14, 1996.

XP-002080696—Patent Abstracts of Japan, vol. 014, No. 386 (C-0750), Aug. 21, 1990 and JP 02 142891 A (Kawasaki Steel Corp.), May 31, 1990.

Shih, Wei, "Development of Carbon—Carbon Composites for Electronic Thermal Management Applications," IDA Workshop, May 3-5, 1994, pp. III-119-III-136.

Engle, G.B., A.R. Phillips Laboratory Contract No. F29601-93-C-0165, "High Thermal Conductivity C/C Composites for Thermal Management," IDA Workshop, May 3-5, 1994, pp. III-137-III-148.

Hager, Joseph W. and Lake, Max L., "Novel Hybrid Composites Based on Carbon Foams," Mat. Res. Soc. Symp., Materials Research Society, 270:29-34 (1992).

Sandhu, S.S. and Hager, J.W., "Formulation of Mathematical Process Model for the Foaming of a Mesophase Carbon Precursor," Mat. Res. Soc. Symp., Materials Research Society, 270:35-40 (1992).

Gibson, L.J. and Ashby, M.F., "Cellular Solids: Structure & Properties," pp. 1-277, Pergamon Press, New York (1988).

Gibson, J.J., "Modeling the Mechanical Behavior of Cellular Materials," Mat. Sci. and Eng. A110, pp. 1-36 (1989).

Knippenberg, W.F. and Lersmacher, B., "Carbon Foam," Phillips Tech. Rev. 36, pp. 93-103 (1976), No. 4.

White, J.L. and Sheaffer, P.M., "Pitch-Based Processing of Carbon—Carbon Composites," Carbon, 27: pp. 697-707 (1989).

Hager, Joseph W., "Idealized Strut Geometrics for Open-Celled Foams," Mat. Res. Sco. Symp., Materials Research Socity, 270:41-46 (1992).

Aubert, J.H., MRS Symposium Proceedings, "Microcellular Foams Prepared from Demixed Polymer Solutions," 207:117-127 (1991).

Cowland, F.C. and Lewis, J.C., "Vitreous Carbon—A New Foam of Carbon," J. of Mat. Sci. 2:507-512 (1967).

Noda, T., Inagaki, M. and Yamada, S. "Glass-Like Carbons," J. of Non-Crystalline Solids, 1:285-302 (1969).

Davies, G.J. and Zhen, Shu "Review": Metallic Foams: Their Production, Properties and Applications, J. of Mat. Sci. 18: pp. 1899-1911 (1983).

Hager, J., et al., "Idealized Ligament Formation and Geometry in Open-Celled Foams," 21st Bienniel Conf. on Carbon Extended Abstracts, p. 102 (1993).

Hager, J., et al., "Progress in Open-Celled Carbon Foams," 40th International Sampe Symposium, Anaheim, CA (May 8-11, 1995).

* cited by examiner

Surface heats due to re-entry

PCM keeps surface cooler than with normal materials

FOAM PRODUCED IN BOTTOM OF SODA CAN.

FOAM PRODUCED IN ALUMINUM WEIGHING DISH.

FOAM REMOVED FROM ALUMINUM WEIGHING DISH AND TURNED OVER, EXPOSING SMOOTH INTEGRATED SURFACE (FACE)

PITCH-BASED CARBON FOAM HEAT SINK WITH PHASE CHANGE MATERIAL

CROSS-REFERENCE TO RELATED APPLICATIONS

This application is a (1) divisional of U.S. patent application Ser. No. 09/489,640 filed on Jan. 24, 2000 now U.S. Pat. No. 6,780,505, which itself is a (2) continuation of U.S. patent application Ser. No. 09/093,406 filed on Jun. 8, 1998, now U.S. Pat. No. 6,037,032, which is itself a continuation-in-part of U.S. patent application Ser. No. 08/921,875 filed Sep. 2, 1997 now U.S. Pat. No. 6,033,506 and U.S. patent application Ser. No. 08/923,877 filed on Sep. 2, 1997 now abandoned, and (3) a continuation-in-part of U.S. patent application Ser. No. 09/337,027 filed Jun. 25, 1999 now U.S. Pat. No. 6,261,485, which itself is a continuation of U.S. patent application Ser. No. 08/921,875 filed Sep. 2, 1997 now U.S. Pat. No. 6,033,506, and (4) a continuation-in-part of U.S. patent application Ser. No. 09/136,596 filed Aug. 19, 1998 now U.S. Pat. No. 6,387,343, which itself is a divisional of U.S. patent application Ser. No. 08/921,875 filed Sep. 2, 1997 now U.S. Pat. No. 6,033,506.

STATEMENT REGARDING FEDERALLY SPONSORED RESEARCH

The United States Government has rights in this invention pursuant to contract No. DE-AC05-96OR22464 between the United States Department of Energy and Lockheed Martin Energy Research Corporation.

BACKGROUND OF THE INVENTION

The present invention relates to porous carbon foam filled with phase change materials and encased to form a heat sink product, and more particularly to a process for producing them.

There are currently many applications that require the storage of large quantities of heat for either cooling or heating an object. Typically these applications produce heat so rapidly that normal dissipation through cooling fins, natural convection, or radiation cannot dissipate the heat quickly enough and, thus, the object over heats. To alleviate this problem, a material with a large specific heat capacity, such as a heat sink, is placed in contact with the object as it heats. During the heating process, heat is transferred to the heat sink from the hot object, and as the heat sink's temperature rises, it "stores" the heat more rapidly than can be dissipated to the environment through convection. Unfortunately, as the temperature of the heat sink rises the heat flux from the hot object decreases, due to a smaller temperature difference between the two objects. Therefore, although this method of energy storage can absorb large quantities of heat in some applications, it is not sufficient for all applications Another method of absorbing heat is through a change of phase of the material, rather than a change in temperature. Typically, the phase transformation of a material absorbs two orders of magnitude greater thermal energy than the heat capacity of the material. For example, the vaporization of 1 gram of water at 100° C. absorbs 2,439 joules of energy, whereas changing the temperature of water from 99° C. to 100° C. only absorbs 4.21 Joules of energy. In other words, raising the temperature of 579 grams of water from 99° C. to 100° C. absorbs the same amount of heat as evaporating 1 gram of water at 100° C. The same trend is found at the melting point of the material. This phenomenon has been utilized in some applications to either absorb or evolve tremendous amounts of energy in situations where heat sinks will not work.

Although a solid block of phase change material has a very large theoretical capacity to absorb heat, the process is not a rapid one because of the difficulties of heat transfer and thus it cannot be utilized in certain applications. However, the utilization of the high thermal conductivity foam will overcome the shortcomings described above. If the high conductivity foam is filled with the phase change material, the process can become very rapid. Because of the extremely high conductivity in the struts of the foam, as heat contacts the surface of the foam, it is rapidly transmitted throughout the foam to a very large surface area of the phase change material. Thus, heat is very quickly distributed throughout the phase change material, allowing it to absorb or emit thermal energy extremely quickly without changing temperature, thus keeping the driving force for heat transfer at its maximum.

Heat sinks have been utilized in the aerospace community to absorb energy in applications such as missiles and aircraft where rapid heat generation is found. A material that has a high heat of melting is encased in a graphite or metallic case, typically aluminum, and placed in contact with the object creating the heat. Since most phase change materials have a low thermal conductivity, the rate of heat transfer through the material is limited, but this is offset by the high energy absorbing capability of the phase change. As heat is transmitted through the metallic or graphite case to the phase change material, the phase change material closest to the heat source begins to melt. Since the temperature of the phase change material does not change until all the material melts, the flux from the heat source to the phase change material remains relatively constant. However, as the heat continues to melt more phase change material, more liquid is formed. Unfortunately, the liquid has a much lower thermal conductivity, thus hampering heat flow further. In fact, the overall low thermal conductivity of the solid and liquid phase change materials limits the rate of heat absorption and, thus, reduces the efficiency of the system.

Recent developments of fiber-reinforced composites, including carbon foams, have been driven by requirements for improved strength, stiffness, creep resistance, and toughness in structural engineering materials. Carbon fibers have led to significant advancements in these properties in composites of various polymeric, metal, and ceramic matrices.

However, current applications of carbon fibers have evolved from structural reinforcement to thermal management in application ranging from high-density electronic modules to communication satellites. This has stimulated research into novel reinforcements and composite processing methods. High thermal conductivity, low weight, and low coefficient of thermal expansion are the primary concerns in thermal management applications. See Shih, Wei, "Development of Carbon-Carbon Composites for Electronic Thermal Management Applications," IDA Workshop, May 3–5, 1994, supported by A F Wright Laboratory under Contract Number F33615-93-C-2363 and A R Phillips Laboratory Contract Number F29601-93-C-0165 and Engle, G. B., "High Thermal Conductivity C/C Composites for Thermal Management," IDA Workshop, May 3–5, 1994, supported by A F Wright Laboratory under Contract F33615-93-C-2363 and A R Phillips Laboratory Contract Number F29601-93-C-0165. Such applications are striving towards a sandwich type approach in which a low-density structural core material (i.e. honeycomb or foam) is sandwiched between a high thermal conductivity facesheet. Structural cores are limited to low density materials to ensure that the weight limits are not exceeded. Unfortunately, carbon foams and carbon honeycomb materials are the only available materials for use in high temperature applications (>1600° C.). High thermal conductivity carbon honeycomb materials are extremely.expensive to manufacture compared to low conductivity honeycombs, therefore, a performance penalty is paid for low cost materials. High conductivity carbon foams are also more expensive to manufacture than low conductivity carbon foams, in part, due to the starting materials.

In order to produce high stiffness and high conductivity carbon foams, invariably, a pitch must be used as the precursor. This is because pitch is the only precursor which forms a highly aligned graphitic structure which is a requirement for high conductivity. Typical processes utilize a blowing technique to produce a foam of the pitch precursor in which the pitch is melted and passed from a high pressure region to a low pressure region. Thermodynamically, this produces a "Flash," thereby causing the low molecular weight compounds in the pitch to vaporize (the pitch boils), resulting in a pitch foam. See Hagar, Joseph W. and Max L. Lake, "Novel Hybrid Composites Based on Carbon Foams," *Mat. Res. Soc. Symp.*, Materials Research Society, 270: 29–34 (1992); Hagar, Joseph W. and Max L. Lake, "Formulation of a Mathematical Process Model Process Model for the Foaming of a Mesophase Carbon Precursor," Mat Res. Soc. Symp., Materials Research Society, 270:35–40 (1992); Gibson, L. J. and M. F. Ashby, *Cellular Solids: Structures & Properties*, Pergamon Press, New York (1988); Gibson, L. J., Mat. Sci. and Eng A110, 1 (1989); Knippenberg and B. Lersmacher, Phillips Tech. Rev., 36(4), (1976); and Bonzom, A., P. Crepaux and E. J. Moutard, U.S. Pat. No. 4,276,246, (1981). Then, the pitch foam must be oxidatively stabilized by heating in air (or oxygen) for many hours, thereby, crosslinking the structure and "stabilizing" the pitch so it does not melt during carbonization. See Hagar, Joseph W. and Max L. Lake, "Formulation of a Mathematical Process Model Process Model for the Foaming of a Mesophase Carbon Precursor, *Mat. Res. Soc. Symp.*, Materials Research Society, 270:35–40 (1992); and White, J. L., and P. M. Shaeffer. Carbon, 27:697 (1989). This is a time consuming step and can be an expensive step depending on the part size and equipment required. The "stabilized" or oxidized pitch is then carbonized in an inert atmosphere to temperatures as high as 1100° C. Then, graphitization is performed at temperatures as high as 3000° C. to produce a high thermal conductivity graphitic structure, resulting in a stiff and very thermally conductive foam.

Other techniques utilize a polymeric precursor, such as phenolic, urethane, or blends of these with pitch. See Hagar, Joseph W. and Max L. Lake, "Idealized Strut Geometries for Open-Celled Foams," *Mat. Res. Soc. Symp.*, Materials Research Society, 270:41–46 (1992); Aubert, J. W., MRS Symposium Proceedings, 207:117–127 (1990); Cowlard, F. C. and J. C. Lewis, J. of Mat. Sci., 2:507–512 (1967); and Noda, T., Inagaki and S. Yamada, J. of Non-Crystalline Solids, 1:285–302, (1969). High pressure is applied and the sample is heated. At a specified temperature, the pressure is released, thus causing the liquid to foam as volatile compounds are released. The polymeric precursors are cured and then carbonized without a stabilization step. However, these precursors produce a "glassy" or vitreous carbon which does not exhibit graphitic structure and, thus, has low thermal conductivity and low stiffness. See Hagar, Joseph W. and Max L. Lake, "Idealized Strut Geometries for Open-Celled Foams," *Mat. Res. Soc. Symp.*, Materials Research Society, 270:41–46 (1992).

In either case, once the foam is formed, it is then bonded in a separate step to the facesheet used in the composite. This can be an expensive step in the utilization of the foam.

The extraordinary mechanical properties of commercial carbon fibers are due to the unique graphitic morphology of the extruded filaments. See Edie, D. D., "Pitch and Mesophase Fibers," in *Carbon Fibers, Filaments and Composites*, Figueiredo (editor), Kluwer Academic Publishers, Boston, pp. 43–72 (1990). Contemporary advanced structural composites exploit these properties by creating a disconnected network of graphitic filaments held together by an appropriate matrix. Carbon foam derived from a pitch precursor can be considered to be an interconnected network of graphitic ligaments or struts, as shown in FIG. 1. As such interconnected networks, they represent a potential alternative as reinforcement in structural composite materials.

The process of this invention overcomes current manufacturing limitations by avoiding a "blowing" or "pressure release" technique to produce the foam. Furthermore, an oxidation stabilization step is not required, as in other methods used to produce pitch based carbon foams with a highly aligned graphitic structure. This process is less time consuming, and therefore, will be lower in cost and easier to fabricate. The foam can be produced with an integrated sheet of high thermal conductivity carbon on the surface of the foam, thereby producing a carbon foam with a smooth sheet on the surface to improve heat transfer.

SUMMARY OF THE INVENTION

An object of the present invention is production of encased high thermal conductivity porous carbon foam filled with a phase change material wherein tremendous amounts of thermal energy are stored and emitted very rapidly. The porous foam is filled with a phase change material (PCM) at a temperature close to the operating temperature of the device. As heat is added to the surface, from a heat source such as a computer chip, friction due to re-entry through the atmosphere, or radiation such as sunlight, it is transmitted rapidly and uniformly throughout the foam and then to the phase change material. As the material changes phase, it absorbs orders of magnitude more energy than non-PCM material due to transfer of the latent heat of fusion or vaporization. Conversely, the filled foam can be utilized to emit energy rapidly when placed in contact with a cold object.

Non-limiting embodiments disclosed herein are a device to rapidly thaw frozen foods or freeze thawed foods, a design to prevent overheating of satellites or store thermal energy as they experience cyclic heating during orbit, and a design to cool leading edges during hypersonic flight or re-entry from space.

Another object of the present invention is to provide carbon foam and a composite from a mesophase or isotropic pitch such as synthetic, petroleum or coal-tar based pitch. Another object is to provide a carbon foam and a composite from pitch which does not require an oxidative stabilization step.

These and other objectives are accomplished by a method of producing carbon foam heat sink wherein an appropriate mold shape is selected and preferably an appropriate mold release agent is applied to walls of the mold. Pitch is introduced to an appropriate level in the mold, and the mold is purged of air by applying a vacuum, for example. Alternatively, an inert fluid could be employed. The pitch is heated to a temperature sufficient to coalesce the pitch into a liquid which preferably is of about 50° C. to about 100° C. above the softening point of the pitch. The vacuum is released and an inert fluid applied at a static pressure up to about 1000 psi. The pitch is heated to a temperature sufficient to cause gases to evolve and foam the pitch. The pitch is further heated to a temperature sufficient to coke the pitch and the pitch is cooled to room temperature with a simultaneous and gradual release of pressure. The foam is then filled with a phase change material and encased to produce an efficient heat storage product.

In another aspect, the previously described steps are employed in a mold composed of a material such that the molten pitch does not adhere to the surface of the mold.

In yet another aspect, the objectives are accomplished by the carbon foam product produced by the methods disclosed herein including a foam product with a smooth integral facesheet.

In still another aspect a carbon foam composite product is produced by adhering facesheets to the carbon foam produced by the process of this invention.

Figure 15A:
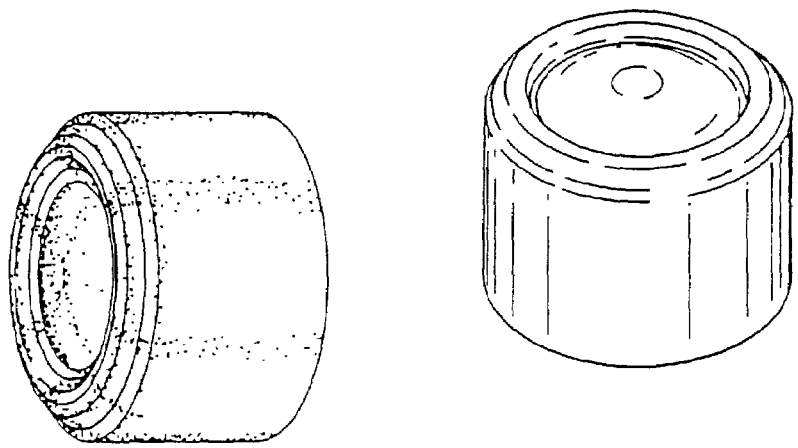
Figure 15B:
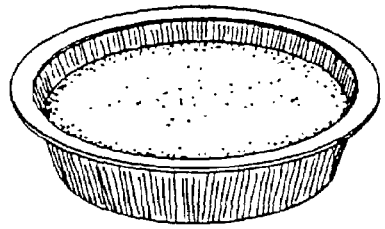
Figure 15C:
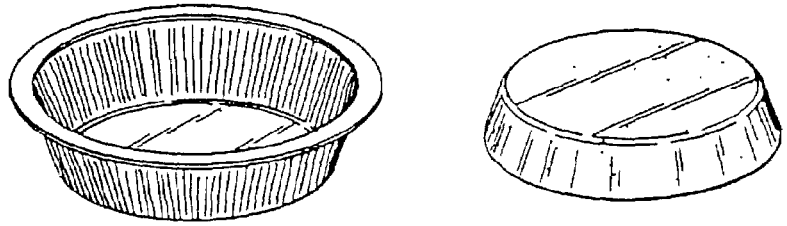

FIGS. 15A–C are photographs illustrating foam produced with aluminum crucibles and the smooth structure or face sheet that develops.

Figure 16A:
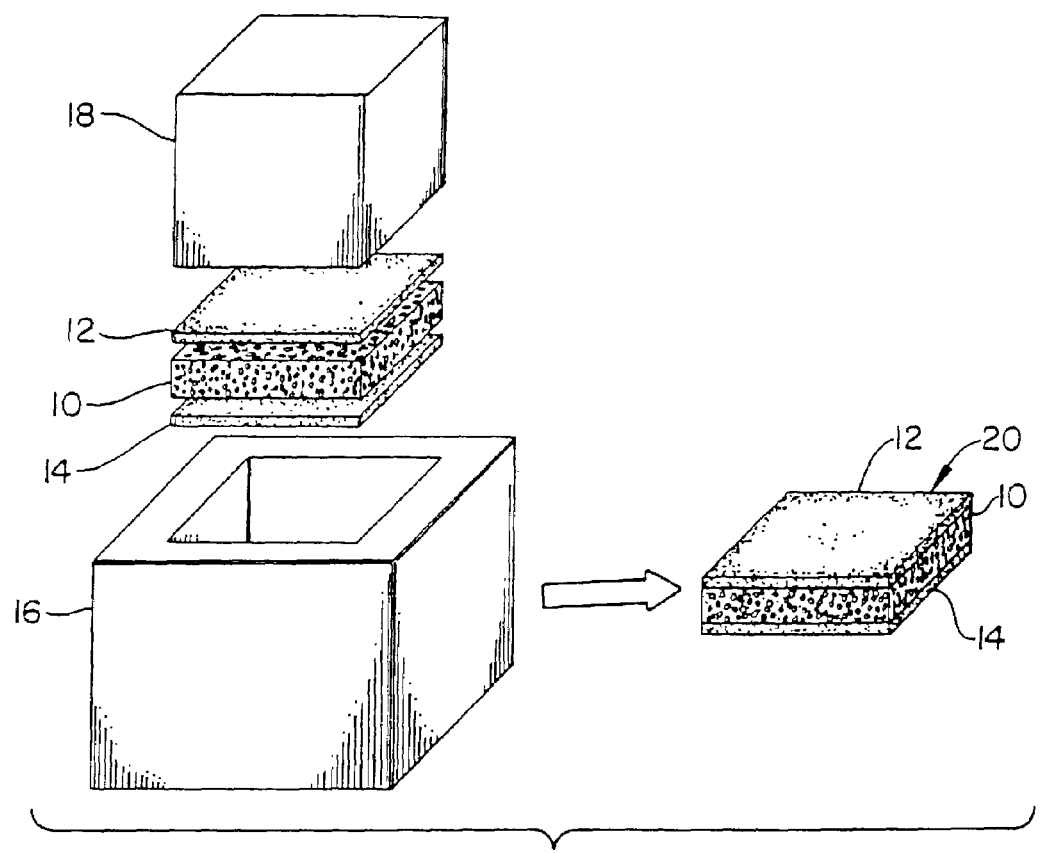

FIG. 16A is a schematic view illustrating the production of a carbon foam composite made in accordance with this invention.

Figure 16B:
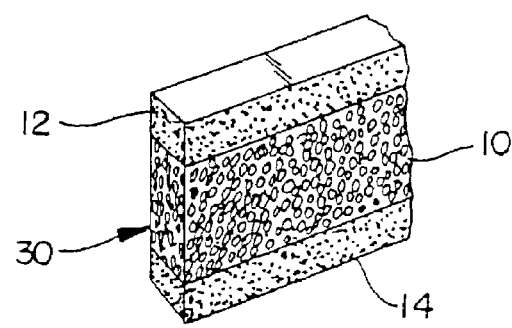

FIG. 16B is a perspective view of the carbon foam composite of this invention.

DETAILED DESCRIPTION OF THE INVENTION

In order to illustrate the carbon foam heat sink product of this invention, the following examples are set forth. They are not intended to limit the invention in any way.

EXAMPLE 1

Device for Thawing Food

Figure 1:
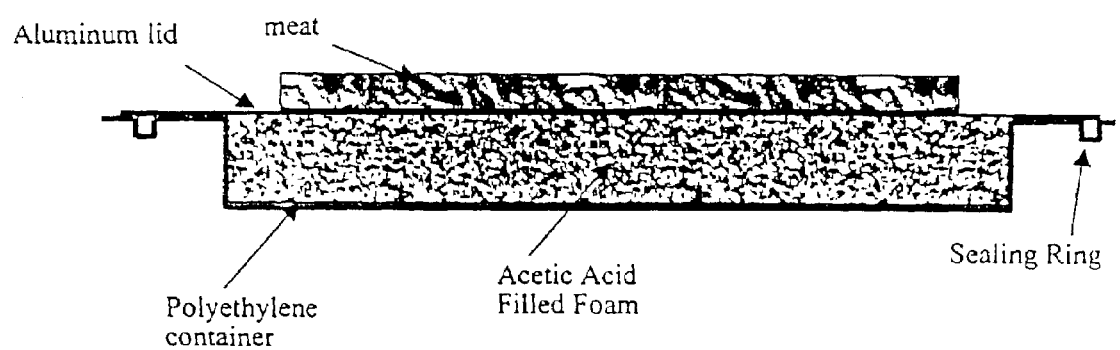
FIG. 1 is section cut of a heat sink device for thawing food using acetic acid as the phase change material.

Acetic acid has a heat of melting of 45 J/g at a melting point of 11° C. The heat of melting of food, primarily ice, is roughly 79 J/g at 0° C. Therefore, take a block of foam and fill it with liquid acetic acid at room temp. The foam will be encased in a box made from an insulating polymer such as polyethylene on all sides except the top. The top of the foam/acetic acid block will be capped with a high thermal conductivity aluminum plate that snaps into place thus sealing the foam/acetic acid inside the polymer case (illustrated in FIG. 1). If the foam block is 10-in.×15-in.×0.5-in. thick, the mass of foam is 614 grams. The mass of acetic acid that fills the foam is roughly 921 grams. Therefore, when a piece of frozen meat is placed in contact with the top of the aluminum block, the foam will cool to the freezing point of the acetic acid (11° C.). At this point, the heat given off from the acetic acid as it freezes (it also remains at 11° C.) will be equivalent to 49 KJ. This heat is rapidly transferred to the frozen meat as it thaws (it also remains at 0° C.). This amount of heat is sufficient to melt roughly 500 grams (1 lb.) of meat.

EXAMPLE 2

Heat Sink to Prevent Overheating of Satellites During Cyclic Orbits

Figure 2:
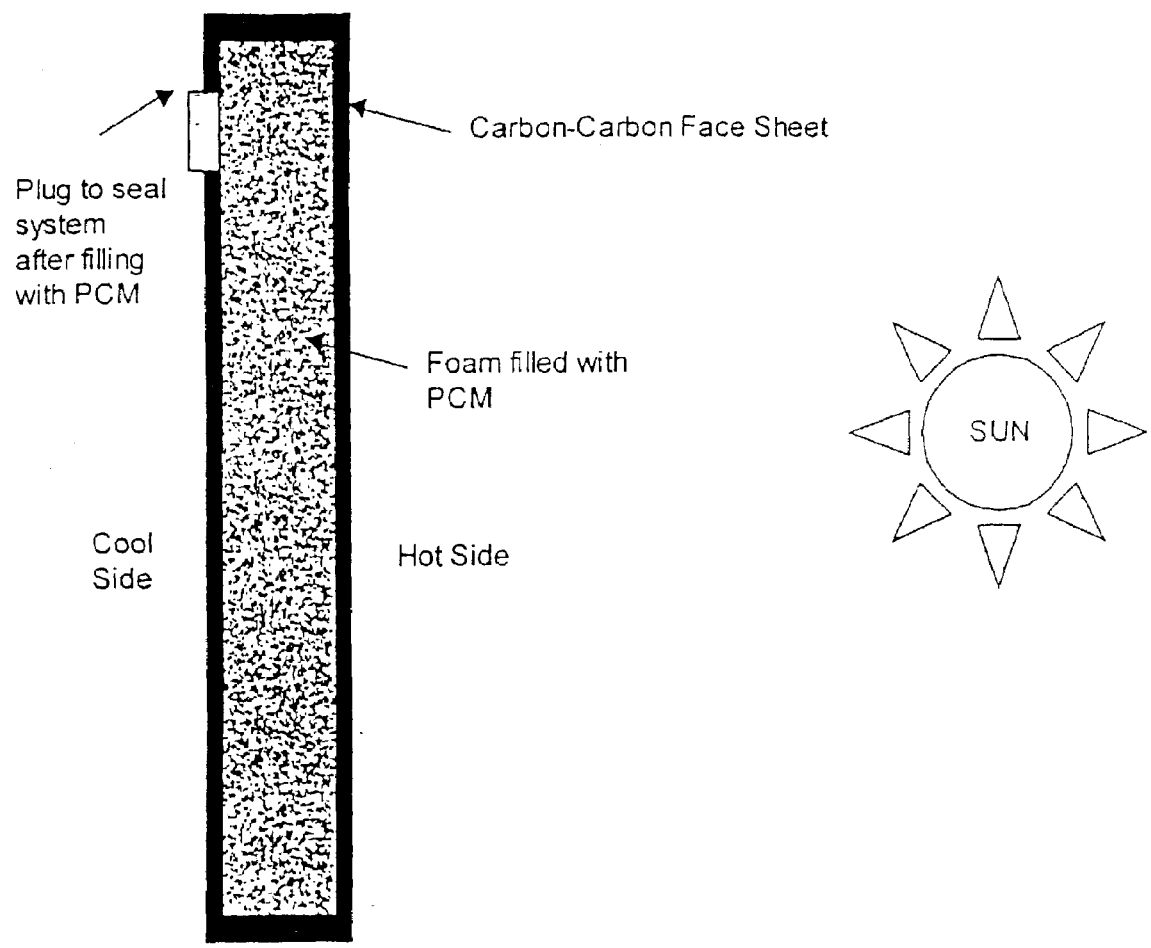
FIG. 2 is a section cut of a heat sink to prevent overheating of satellites during cyclic orbits.

Produce a carbon-carbon composite with the foam in which the foam is a core material with carbon-carbon face sheets (FIG. 2). Fill the foam core with a suitable phase chance material, such as a paraffin wax, that melts around the maximum operating temperature of the satellite components. One method to perform this would be to drill a hole in one surface of the carbon-carbon face sheets and vacuum fill the phase change material in the liquid state into the porous foam. Once filled, the sample can be cooled (the phase change material solidifies) and the hole can be plugged with an epoxy or screw-type cap. The epoxy and any other sealant must be able to withstand the operating temperature of the application. The foam-core composite will then be mounted on the side of the satellite that is exposed to the sun during orbit. As the satellite orbits the earth and is exposed to the sun, the radiant energy from the sun will begin to heat the composite panel to the melting point of the phase change material. At this point, the panel will not increase in temperature as the phase change material melts. The amount of radiant energy the panel can absorb will be dependent on the thickness and outer dimensions of the panel. This can be easily calculated and designed through knowledge of the orbit times of the satellite such that the material never completely melts and, thus, never exceeds the melt temperature. Then, when the satellite leaves the view of the sun, it will begin to radiate heat to space and the phase change material will begin to freeze. The cycle will repeat itself once the satellite comes into view of the sun once again.

EXAMPLE 3

Heat Sink for Leading Edges

Figure 3:
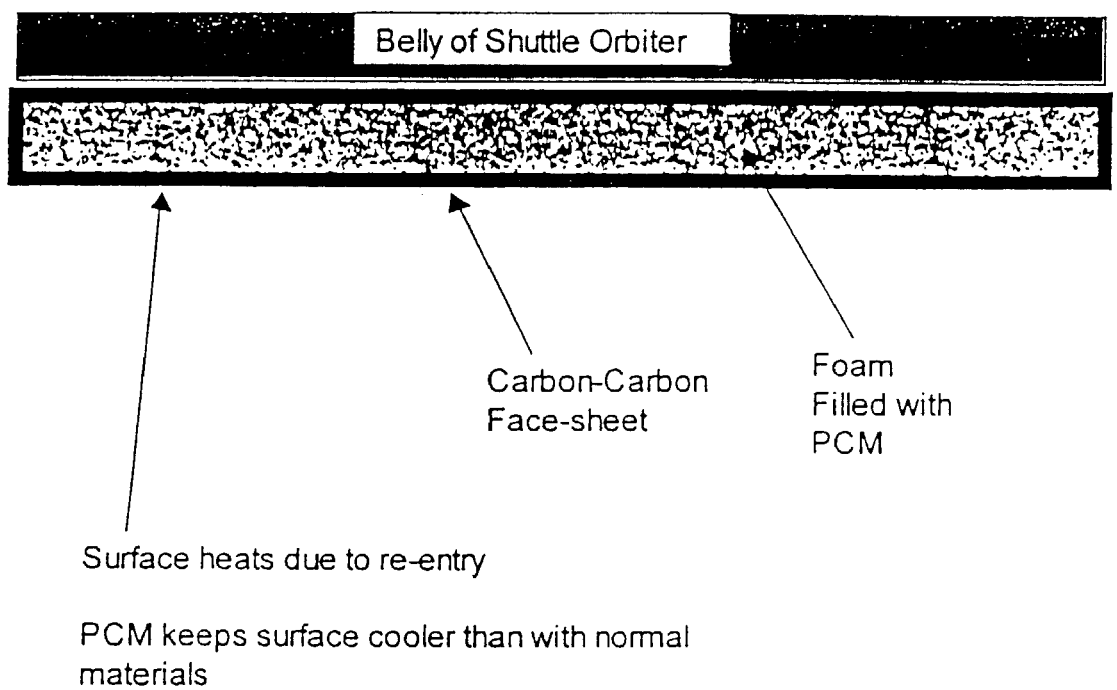
FIG. 3 is a section cut of a heat sink used on the leading edge of a shuttle orbiter.
Figure 4:
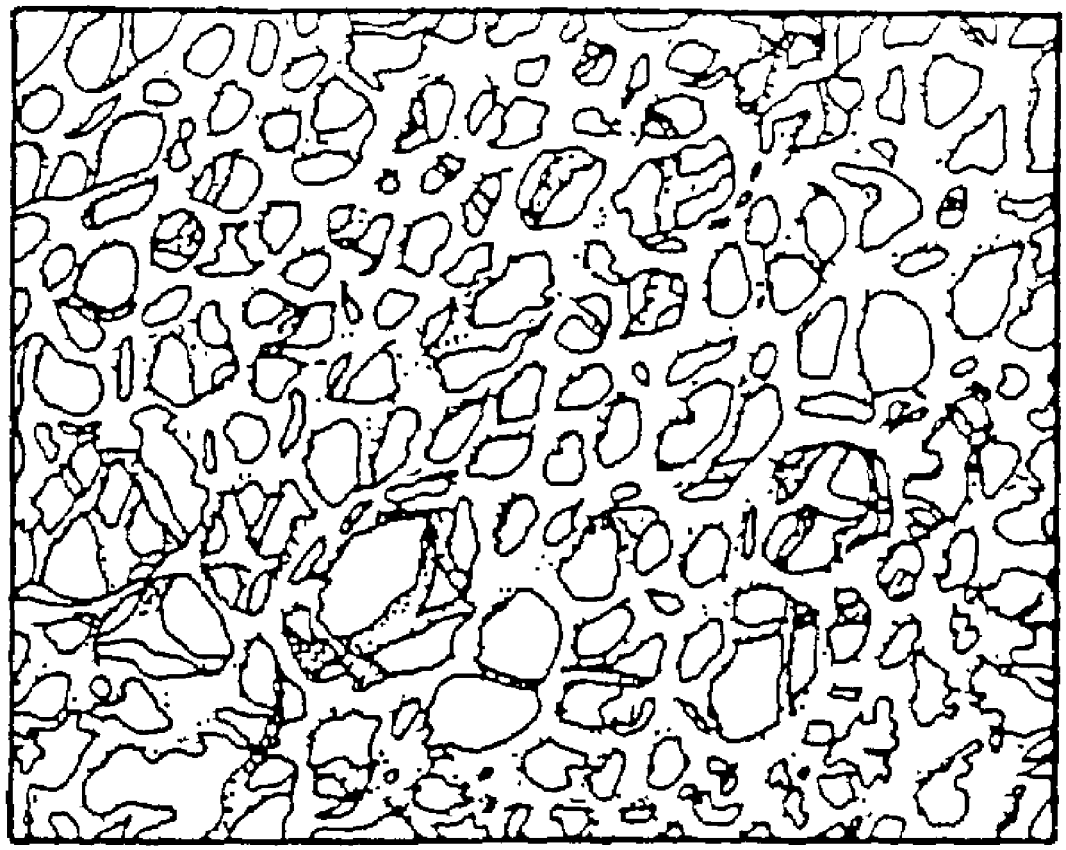
FIG. 4 is a micrograph illustrating typical carbon foam with interconnected carbon ligaments and open porosity.
Figure 5:
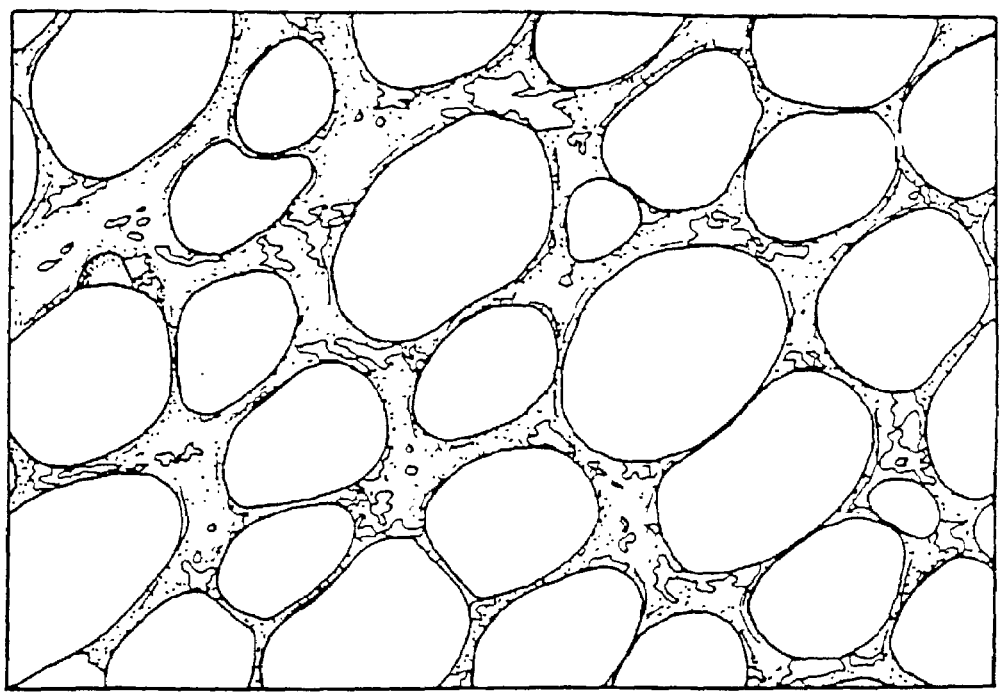
FIG. 5–9 are micrographs of pitch-derived carbon foam graphitized at 2500° C. and at various magnifications.
Figure 6:
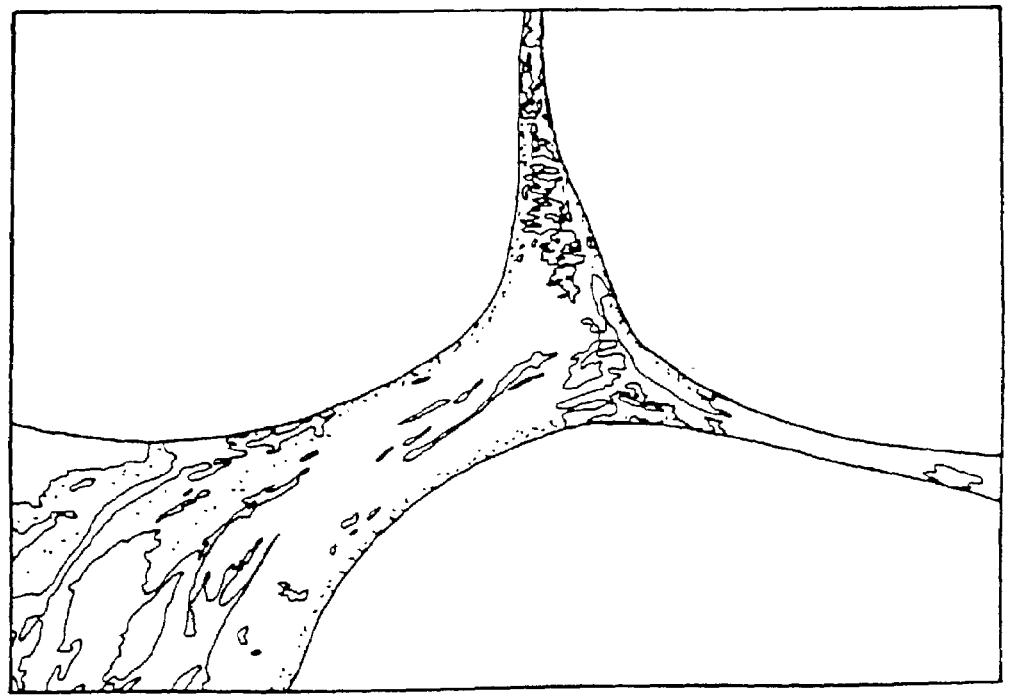
Figure 7:
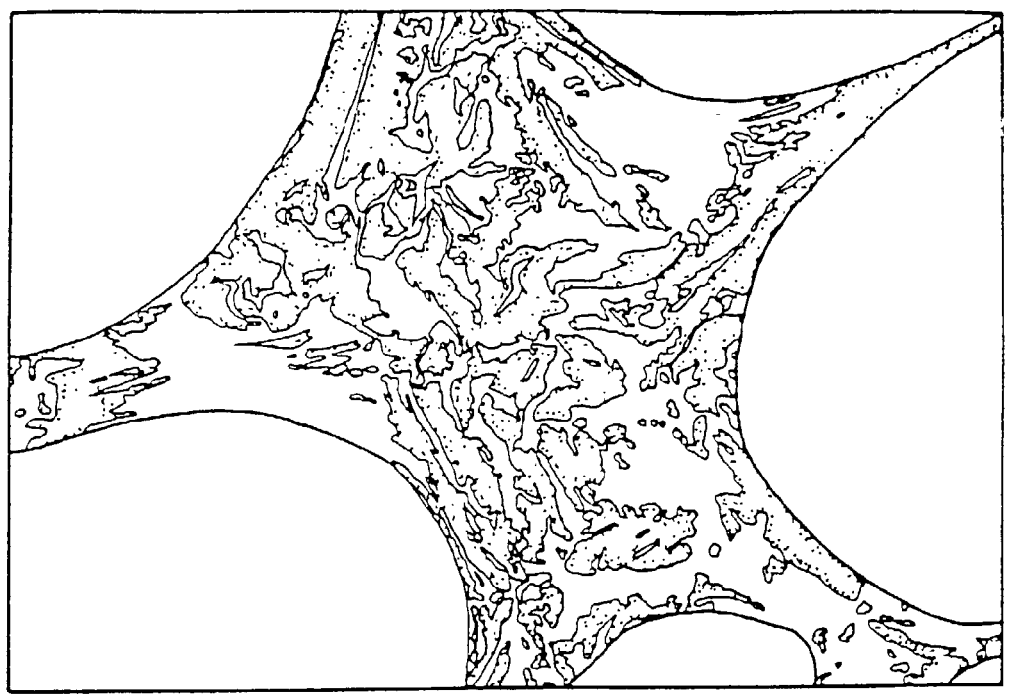
Figure 8:
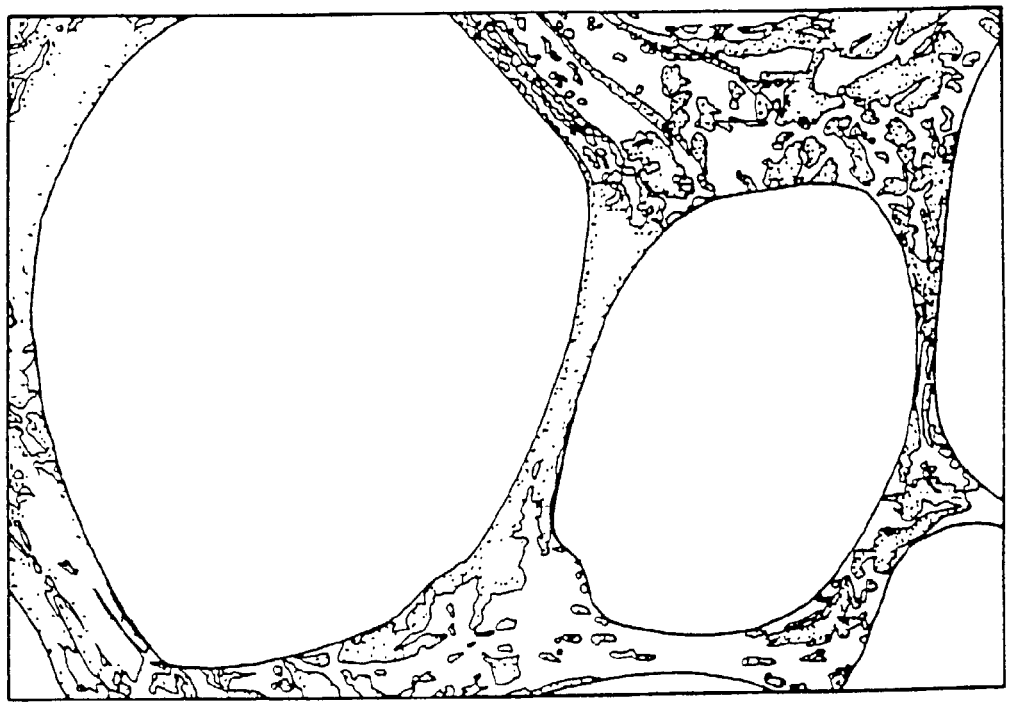
Figure 9:
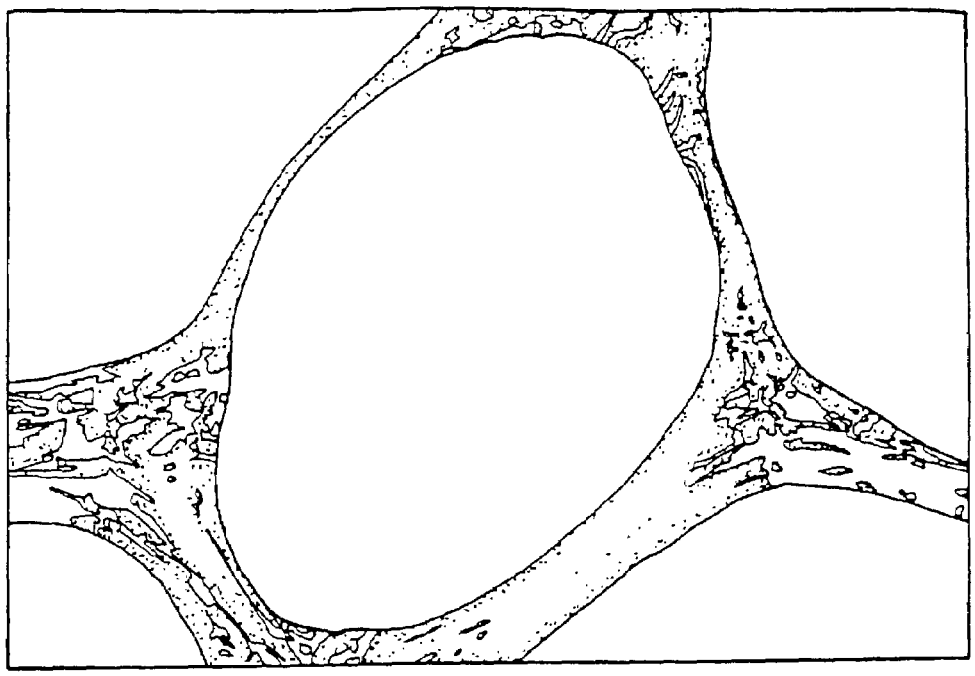

Currently, the shuttle orbiter experiences extreme heats during reentry. Specifically, the leading edges of the craft can reach 1800° C. and the belly of the craft can reach temperatures as high as 1200° C. If a foam core composite panel is placed at the surface of the leading edges and at the surface of the belly (FIG. 3), it would be able to absorb enough energy to dramatically reduce the maximum temperature of the hot areas. This also would permit a faster re-entry or (steeper glide slope) and maintain the current maximum temperatures. In this case the phase change material would most likely be an alloy, e.g. germanium-silicon, which melts around 800–900° C. and does not vaporize until much higher than the maximum temperature of the craft.

For example, Germanium has a heat of formation (heat of melting) of 488 J/g. This would require 1.0 Kg of Germanium to reduce the temperature of 1 Kg of existing carbon/carbon heat-shield by 668° C. In other words, if the existing carbon-carbon were replaced pound-for-pound with germanium filled foam, the maximum temperature of the heat shield would only be about 1131° C. instead of about 1800° C. during re-entry, depending on the duration of thermal loading.

EXAMPLE 4

Pitch powder, granules, or pellets are placed in a mold with the desired final shape of the foam. These pitch materials can be solvated if desired. In this example, Mitsubishi ARA-24 mesophase pitch was utilized. A proper mold release agent or film is applied to the sides of the mold to allow removal of the part. In this case, Boron Nitride spray and Dry Graphite Lubricant were separately used as a mold release agent. If the mold is made from pure aluminum, no mold release agent is necessary since the molten pitch does not adhere to the aluminum and, thus, will not stick to the mold. Similar mold materials may be found that the pitch does not adhere and, thus, they will not need mold release. The sample is evacuated to less than 1 torr and then heated to a temperature approximately 50 to 100° C. above the softening point. In this case where Mitsubishi ARA24 mesophase pitch was used, 300° C. was sufficient. At this point, the vacuum is released to a nitrogen blanket and then a pressure of up to 1000 psi is applied. The temperature of the system is then raised to 800° C., or a temperature sufficient to coke the pitch which is 500° C. to 1000° C. This is performed at a rate of no greater than 5° C./min. and preferably at about 2° C./min. The temperature is held for at least 15 minutes to achieve an assured soak and then the furnace power is turned off and cooled to room temperature. Preferably the foam was cooled at a rate of approximately 1.5° C./min. with release of pressure at a rate of approximately 2 psi/min. Final foam temperatures for three product runs were 500° C., 630° C. and 800° C. During the cooling cycle, pressure is released gradually to atmospheric conditions. The foam was then heat treated to 1050° C. (carbonized) under a nitrogen blanket and then heat treated in separate runs to 2500° C. and 2800° C. (graphitized) in Argon.

Figure 10:
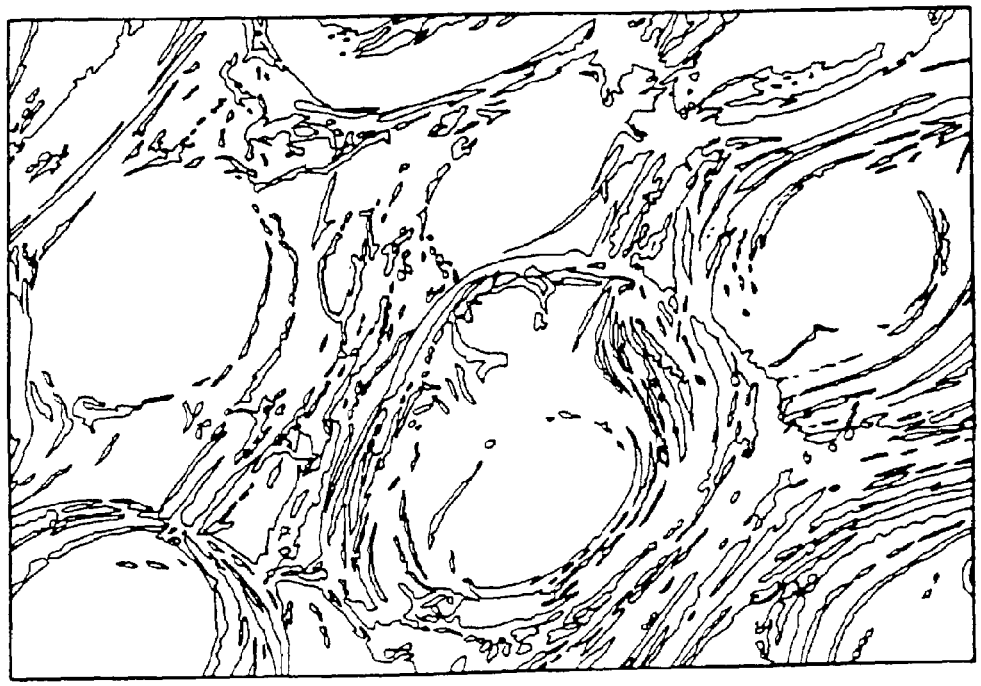
FIG. 10 is a SEM micrograph of carbon foam produced by the process of this invention.
Figure 11:
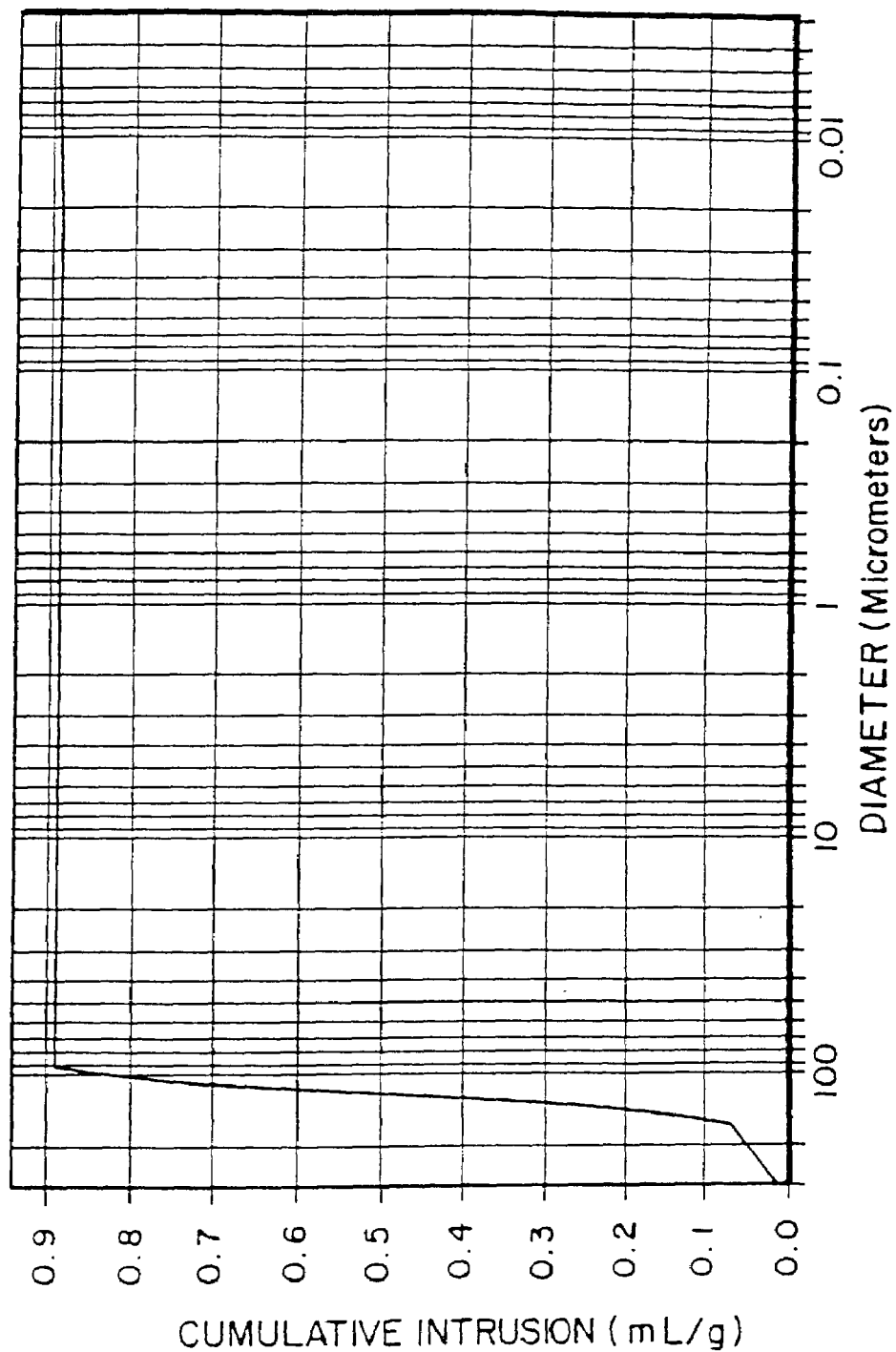
FIG. 11 is a chart illustrating cumulative intrusion volume versus pore diameter.
Figure 12:
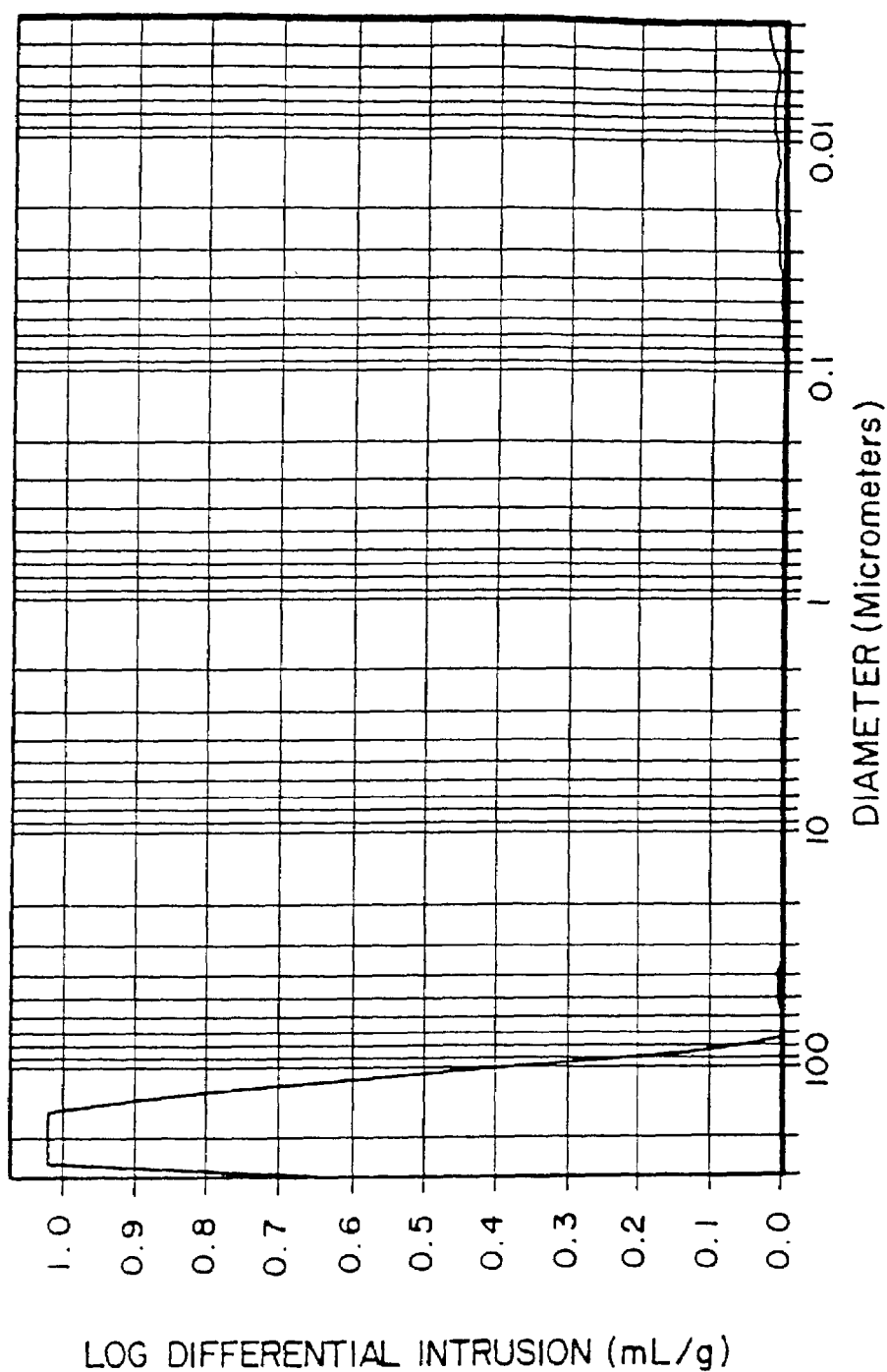
FIG. 12 is a chart illustrating log differential intrusion volume versus pore diameter.
Figure 13:
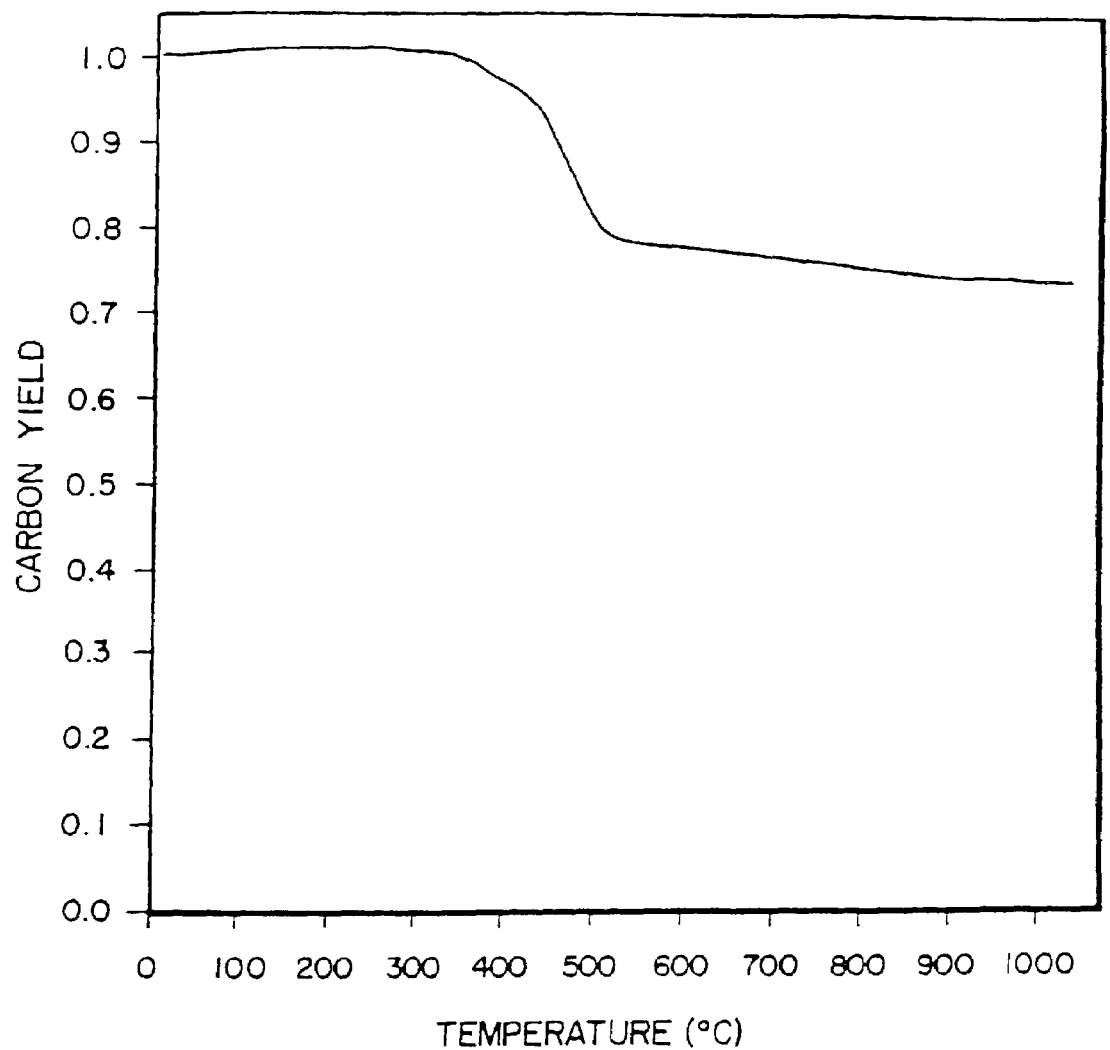
FIG. 13 is a graph illustrating the temperatures at which volatiles are given off from raw pitch.

Carbon foam produced with this technique was examined with photomicrography, scanning electron microscopy (SEM), X-ray analysis, and mercury porisimetry. As can be seen in the FIGS. 5–10, the isochromatic regions under cross-polarized light indicate that the struts of the foam are completely graphitic. That is, all of the pitch was converted to graphite and aligned along the axis of the struts. These struts are also similar in size and are interconnected throughout the foam. This would indicate chat the foam would have high stiffness and good strength. As seen in FIG. 10 by the SEM micrograph of the foam, the foam is open cellular meaning that the porosity is not closed. FIGS. 11 and 12 are results of the mercury porisimetry tests. These tests indicate that the pore sizes are in the range of 90–200 microns.

Figure 14:
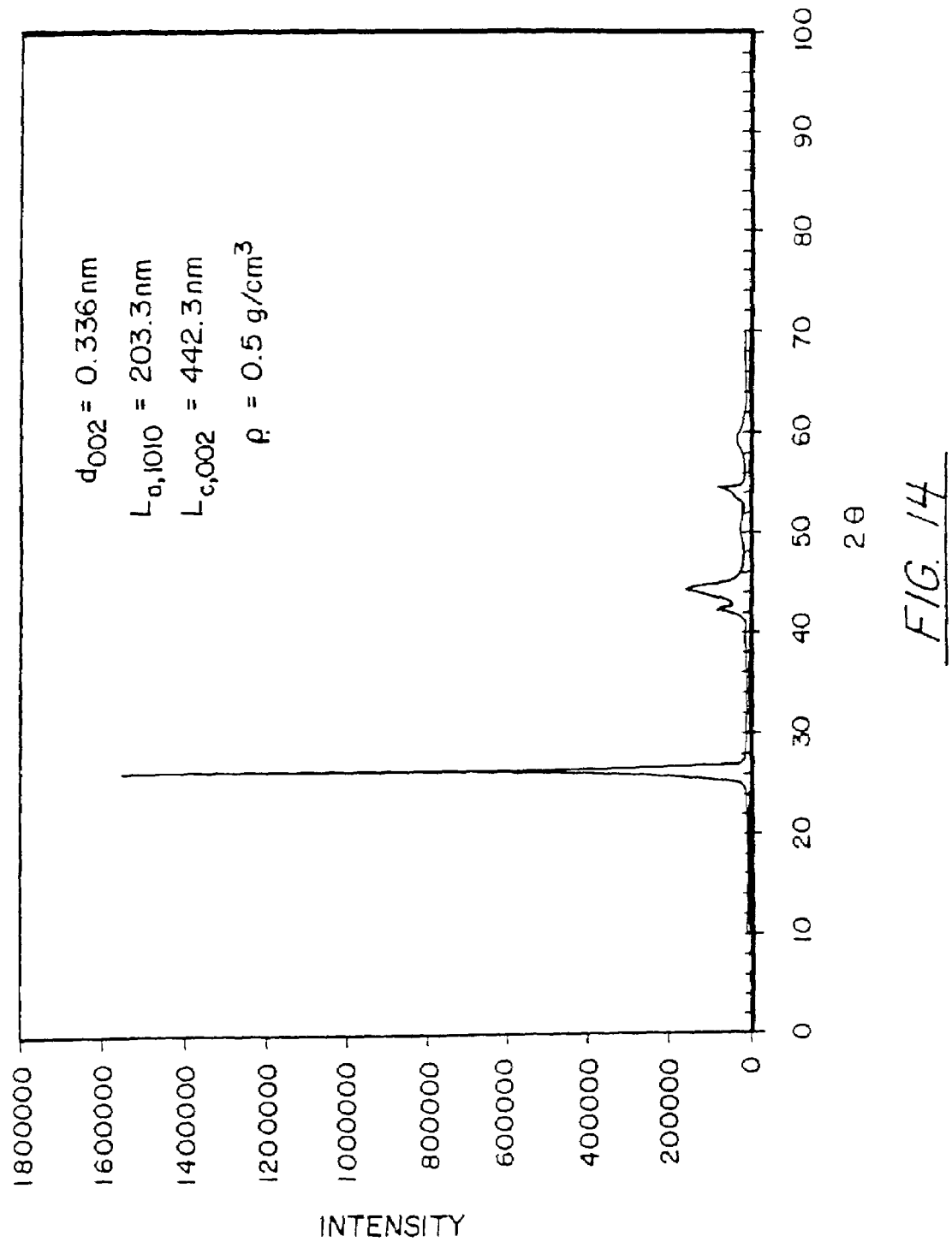
FIG. 14 is an X-ray analysis of the graphitized foam produced by the process of this invention.

A thermogravimetric study of the raw pitch was performed to determine the temperature at which the volatiles are evolved. As can be seen in FIG. 14, the pitch loses nearly 20% of its mass fairly rapidly in the temperature range-between about 420° C. and about 480° C. Although this was performed at atmospheric pressure, the addition of 1000 psi pressure will not shift this effect significantly. Therefore, while the pressure is at 1000 psi, gases rapidly evolved during heating through the temperature range of 420° C. to 480° C. The gases produce a foaming effect (like boiling) on the molten pitch. As the temperature is increased further to temperatures ranging from 500° C. to 1000° C. (depending on the specific pitch), the foamed pitch becomes coked (or rigid), thus producing a solid foam derived from pitch. Hence, the foaming has occurred before the release of pressure and, therefore, this process is very different from previous art.

Samples from the foam were machined into specimens for measuring the thermal conductivity. The bulk thermal conductivity ranged from 58 W/m·K to 106 W/m·K. The average density of the samples was 0.53 g/cm$^3$. When weight is taken into account, the specific thermal conductivity of the pitch derived from foam is over 4 times greater than that of copper. Further derivations can be utilized to estimate the thermal conductivity of the struts themselves to be nearly 700 W/m·K. This is comparable to high thermal conductivity carbon fibers produced from this same ARA24 mesophase pitch.

X-ray analysis of the foam was performed to determine the crystalline structure of the material. The x-ray results are shown in FIG. 14. From this data, the graphene layer spacing ($d_{002}$) was determined to be 0.336 nm. The coherence length ($L_{a,100}$) was determined to be 203.3 nm and the stacking height was determined to be 442.3 nm.

The compression strength of the samples were measured to be 3.4 MPa and the compression modulus was measured to be 73.4 MPa. The foam sample was easily machined and could be handled readily without fear of damage, indicating good strength.

It is important to note that when this pitch is heated in a similar manner, but only under atmospheric pressure, the pitch foams dramatically more than when under pressure. In fact, the resulting foam is so fragile that it could not even be handled to perform tests. Molding under pressure serves to limit the growth of the cells and produces a usable material.

EXAMPLE 5

An alternative to the method of Example 4 is to utilize a mold made from aluminum. In this case two molds were used, an aluminum weighing dish and a sectioned soda can. The same process as set forth in Example 4 is employed except that the final coking temperature was only 630° C., so as to prevent the aluminum from melting.

FIGS. 15A–C illustrate the ability to utilized complex shaped molds for producing complex shaped foam. In one case, shown in FIG. 15A, the top of a soda can was removed and the remaining can used as a mold. No release agent was utilized. Note that the shape of the resulting part conforms to the shape of the soda can, even after graphitization to 2800° C. This demonstrates the dimensional stability of the foam and the ability to produce near net shaped parts.

In the second case, as shown in FIGS. 15B and C employing an aluminum weight dish, a very smooth surface was formed on the surface contacting the aluminum. This is directly attributable to the fact that the molten pitch does not adhere to the surface of the aluminum. This would allow one to produce complex shaped parts with smooth surfaces so as to improve contact area for bonding or improving heat transfer. This smooth surface will act as a face sheet and, thus, a foam-core composite can be fabricated in-situ with the fabrication of the face sheet. Since it is fabricated together and an integral material no interface joints result, thermal stresses will be less, resulting in a stronger material.

The following examples illustrate the production of a composite material employing the foam of this invention.

EXAMPLE 6

Pitch derived carbon foam was produced with the method described in Example 4. Referring to FIG. 16A the carbon foam 10 was then machined into a block 2"×2"×½". Two pieces 12 and 14 of a prepeg comprised of Hercules AS4 carbon fibers and ICI Fibirite Polyetheretherkeytone thermoplastic resin also of 2"×2"×½" size were placed on the top and bottom of the foam sample, and all was placed in a matched graphite mold 16 for compression by graphite plunger 18. The composite sample was heated under an applied pressure of 100 psi to a temperature of 380° C. at a rate of 5° C./min. The composite was then heated under a pressure of 100 psi to a temperature of 650° C. The foam core sandwich panel generally 20 was then removed from the mold and carbonized under nitrogen to 1050° C. and then graphitized to 2800° C., resulting in a foam with carbon-carbon facesheets bonded to the surface. The composite generally 30 is shown in FIG. 16B.

EXAMPLE 7

Pitch derived carbon foam was produced with the method described in Example 4. It was then machined into a block 2"×2"×½". Two pieces of carbon-carbon material, 2"×2"×½", were coated lightly with a mixture of 50% ethanol, 50% phenolic Durez© Resin available from Occidental Chemical Co. The foam block and carbon-carbon material were positioned together and placed in a mold as indicated in Example 6. The sample was heated to a temperature of 150° C. at a rate of 5° C./min and soaked at temperature for 14 hours. The sample was then carbonized under nitrogen to 1050° C. and then graphitized to 2800° C., resulting in a foam with carbon-carbon facesheets bonded to the surface. This is also shown generally at 30 in FIG. 16B.

EXAMPLE 8

Pitch derived carbon foam was produced with the method described in Example 4. The is foam sample was then densified with carbon by the method of chemical vapor infiltration for 100 hours. The density increased to 1.4 g/cm$^3$, the flexural strength was 19.5 MPa and the flexural modulus was 2300 MPa. The thermal conductivity of the raw foam was 58 W/m·K and the thermal conductivity of the densified foam was 94 W/m·K.

EXAMPLE 9

Pitch derived carbon foam was produced with the method described in Example 4. The foam sample was then densified with epoxy by the method of vacuum impregnation. The epoxy was cured at 150° C. for 5 hours. The density increased to 1.37 g/cm$^3$ and the flexural strength was measured to be 19.3 MPa.

Other possible embodiments may include materials, such as metals, ceramics, plastics, or fiber-reinforced plastics bonded to the surface of the foam of this invention to produce a foam core composite material with acceptable properties. Additional possible embodiments include ceramics, glass, or other materials impregnated into the foam for densification.

Based on the data taken to date from the carbon foam material, several observations can be made outlining important features of the invention that include:

1. Pitch-based carbon foam can be produced without an oxidative stabilization step, thus saving time and costs.
2. High graphitic alignment in the struts of the foam is achieved upon graphitization to 2500° C., and thus high thermal conductivity and stiffness will be exhibited by the foam, making them suitable as a core material for thermal-applications.
3. High compressive strengths should be achieved with mesophase pitch-based carbon foams, making them suitable as a core material for structural applications.
4. Foam core composites can be fabricated at the same time as the foam is generated, thus saving time and costs.
5. Rigid monolithic preforms can be made with significant open porosity suitable for densification by the Chemical Vapor Infiltration method of ceramic and carbon infiltrants.
6. Rigid monolithic preforms can be made with significant open porosity suitable for activation, producing a monolithic activated carbon.
7. It is obvious that by varying the pressure applied, the size of the bubbles formed during the foaming will change and, thus, the density, strength, and other properties can be affected.

The following alternative procedures and products can also be effected by the process of this invention:

1. Fabrication of preforms with complex shapes for densification by CVI or Spelt Impregnation.
2. Activated carbon monoliths with high thermal conductivity.
3. Optical absorbent.
4. Low density heating elements.
5. Firewall Material
6. Low secondary electron emission targets for high-energy physics applications.

The present invention provides for the manufacture of pitch-based carbon foam heat sink for structural and thermal composites. The process involves the fabrication of a graphitic foam from a mesophase or isotropic pitch which can be synthetic, petroleum, or coal-tar based. A blend of these pitches can also be employed The simplified process utilizes a high pressure high temperature furnace and thereby, does not require and oxidative stabilization step. The foam has a relatively uniform distribution of pore sizes (~100 microns), very little closed porosity, and density of approximately 0.53 g/cm$^3$. The mesophase pitch is stretched along the struts of the foam structure and thereby produces a highly aligned graphitic structure in the struts These struts will exhibit thermal conductivities and stiffness similar to the very expensive high performance carbon fibers (such as P-120 and K1100). Thus, the foam will exhibit high stiffness and thermal conductivity at a very low density (~0.5 g/cc). This foam can be formed in place as a core material for high temperature sandwich panels for both thermal and structural applications, thus reducing fabrication time. By utilizing an isotropic pitch, the resulting foam can be easily activated to produce a high surface area activated carbon. The activated carbon foam will not experience the problems associated with granules such as attrition, channeling, and large pressure drops.

What is claimed is:

1. An apparatus for thawing frozen food comprising an encased carbon foam containing in at least some of its pores a phase change material that freezes at a temperature above 0° C. but is liquid at room temperature.

2. The apparatus of claim 1 wherein the carbon foam is an essentially graphitic carbon foam having a bulk thermal conductivity from about 58 W/m·°K to about 106 W/m·°K.

3. The apparatus of claim 2 wherein the carbon foam has an open cell pore structure.

4. The apparatus of claim 3 wherein the carbon foam is derived from a mesophase pitch.

5. The apparatus of claim 4 wherein the open cell pore structure of the carbon foam is substantially comprised of ellipsoidal pores.

6. The apparatus of claim 5 wherein the carbon foam is characterized by an X-ray diffraction pattern substantially as depicted in FIG. 14.

7. The apparatus of claim 3 wherein the carbon foam is characterized by an X-ray diffraction pattern having an average d002 spacing of about 0.336.

8. The apparatus of claim 1 wherein the carbon foam is an essentially graphitic carbon foam having a specific thermal conductivity greater than copper.

9. The apparatus of claim 8 wherein the carbon foam is characterized by an open cell pore structure substantially comprised of pores whose planar cross-sectional images are substantially circular or elliptical.

10. The apparatus of claim 9 wherein the carbon foam is characterized by an X-ray diffraction pattern having an average d002 spacing of about 0.336 and exhibiting relatively sharp doublet peaks at 2θ angles between 40 and 50 degrees.

11. The apparatus of claim 1 wherein the carbon foam is an essentially graphitic carbon foam having a specific thermal conductivity greater than four times that of copper.

12. The apparatus of claim 11 wherein the carbon foam is characterized by an open cell pore structure substantially comprised of ellipsoidal pores.

13. The apparatus of claim 12 wherein the carbon foam is characterized by an X-ray diffraction pattern exhibiting relatively sharp doublet peaks at 2θ angles between 40 and 50 degrees.

14. The apparatus of claim 13 wherein the carbon foam is derived from a mesophase pitch.

15. The apparatus of claim 1 wherein the carbon foam is a non-oxidatively stabilized, essentially graphitic carbon foam derived from a mesophase pitch, the carbon foam having an open cell structure and a specific thermal conductivity greater than copper.

16. The apparatus of claim 15 wherein the carbon foam has a specific thermal conductivity greater than four times that of copper.

17. The apparatus of claim 15 wherein the carbon foam is characterized by an X-ray diffraction pattern having an average d002 spacing of about 0.336.

* * * * *